United States Patent
Baumgartner et al.

(10) Patent No.: US 11,200,693 B2
(45) Date of Patent: Dec. 14, 2021

(54) IMAGE PROCESSING

(71) Applicant: KING'S COLLEGE LONDON, London (GB)

(72) Inventors: Christian Baumgartner, London (GB); Daniel Rueckert, London (GB)

(73) Assignee: King's College London, London (GB)

( * ) Notice: Subject to any disclaimer, the term of this patent is extended or adjusted under 35 U.S.C. 154(b) by 136 days.

(21) Appl. No.: 16/338,341

(22) PCT Filed: Sep. 29, 2017

(86) PCT No.: PCT/GB2017/052925
§ 371 (c)(1),
(2) Date: Mar. 29, 2019

(87) PCT Pub. No.: WO2018/060723
PCT Pub. Date: Apr. 5, 2018

(65) Prior Publication Data
US 2020/0027237 A1   Jan. 23, 2020

(30) Foreign Application Priority Data
Sep. 29, 2016   (GB) .................................... 1616536

(51) Int. Cl.
*G06T 7/73*         (2017.01)
*G06T 11/00*        (2006.01)

(52) U.S. Cl.
CPC .............. *G06T 7/73* (2017.01); *G06T 11/001* (2013.01); *G06T 2200/04* (2013.01); *G06T 2207/10016* (2013.01); *G06T 2207/10076* (2013.01); *G06T 2207/20081* (2013.01)

(58) Field of Classification Search
None
See application file for complete search history.

(56) References Cited

U.S. PATENT DOCUMENTS

| | | |
|---|---|---|
| 2009/0074280 A1 | 3/2009 | Lu et al. |
| 2014/0185895 A1 | 7/2014 | Swamy et al. |
| 2016/0081663 A1 | 3/2016 | Chen et al. |
| | (Continued) | |

OTHER PUBLICATIONS

Chen, et al., "Automatic Fetal Ultrasound Standard Plane Detection Using Knowledge Transferred Recurrent Neural Networks", Nov. 18, 2015, pp. 507-514, Publisher: Springer International Publishing Switzerland 2015.

(Continued)

*Primary Examiner* — Matthew C Bella
*Assistant Examiner* — Brian D Shin
(74) *Attorney, Agent, or Firm* — David G. Woodral; Gable Gotwals (57) ABSTRACT

Imaging methods, imaging apparatus and computer program products are disclosed. An imaging method comprises: receiving image data of a 3-dimensional object; and allocating a confidence level to at least a portion of an image frame of the image data using a machine-learning algorithm, the confidence level indicating a likelihood of that image frame having a specified element imaged on a specified plane through the 3-dimensional object. In this way, particular elements when imaged in a desired way can be identified from image data of the 3-dimensional object.

16 Claims, 7 Drawing Sheets

(56) References Cited

U.S. PATENT DOCUMENTS

2017/0116497 A1* 4/2017 Georgescu ........... A61B 8/5223

OTHER PUBLICATIONS

International Search Report and Written Opinion prepared by the European Patent Office for PCT/GB2017/052925, dated Jan. 19, 2018.
Search Report prepared by the UK Intellectual Property Office for GB1616536.7, dated Mar. 23, 2017.
European Search Report issued by the European Patent Office in EP Application No. 17780181 dated Nov. 2, 2020.

* cited by examiner

IMAGE PROCESSING

FIELD OF THE INVENTION

The present invention relates to imaging methods, imaging apparatus and computer program products.

BACKGROUND

Image processing is known. Typically, an imaging device or sensor images an object and provides image data which provides a representation of the object. That image data may be reviewed to identify elements of the object. Although image processing techniques exist to assist in identifying elements of the object, they each have their own shortcomings. Accordingly, it is desired to provide improved image processing techniques.

SUMMARY

According to a first aspect, there is provided an imaging method, comprising: receiving image data of a 3-dimensional object; and allocating a confidence level to at least a portion of an image frame of the image data using a machine-learning algorithm, the confidence level indicating a likelihood of that image frame having a specified element imaged on a specified plane through the 3-dimensional object.

The first aspect recognises that as the complexity of objects increases, identifying elements in the objects becomes more complicated. Also, it is known to provide image data of 3-dimensional objects, which makes identifying elements in those 3-dimensional objects even more complicated. Furthermore, finding a particular view of an element of a 3-dimensional object adds to this complexity.

Accordingly, a method of image processing is provided. The method may comprise the step of receiving image data. The image data may be that of, or represent, an image of a 3-dimensional object. The method may comprise allocating or determining a confidence level for a portion or a part of an image frame of the image data. The confidence level may be determined using a machine learning algorithm. The confidence level may indicate a likelihood or probability that the image frame has a specified, defined or a particular element or feature when imaged or viewed on a specified or particular plane through the 3-dimensional object. In other words, the machine learning algorithm may identify the presence of particular elements or features of the 3-dimensional object when imaged or viewed in a particular way through the 3-dimensional object. In this way, particular elements when imaged in a desired way can be identified from image data of the 3-dimensional object.

In one embodiment, the allocating comprises allocating a plurality of confidence levels to the image frame of the image data, each confidence level indicating a likelihood of that image frame having a corresponding specified element imaged on a corresponding specified plane through the 3-dimensional object. Accordingly, a confidence level may be allocated or assigned which indicates whether each of a number of different elements, when imaged on their own associated plane through the 3-dimensional object, are present in the image frame.

In one embodiment, the allocating comprises allocating a confidence level to each of a plurality of image frames of the image data. Accordingly, the confidence levels may be allocated or assigned to each of a series of image frames of the image data, such as would be provided by a video stream or sequence of image frames through 3-dimensional image data.

In one embodiment, the image data is captured by an operator of an image capture apparatus and the method comprises indicating each confidence level to the operator. Accordingly, the image data may be obtained by an operator of an image capture apparatus, sensor or device. The method may indicate each of the confidence levels to the operator to provide operator feedback.

In one embodiment, the method comprises indicating a change in each confidence level between image frames to the operator. Accordingly, not only may the absolute confidence levels be indicated to the operator, but also any change in confidence levels from image frame to image frame may also be identified to the operator.

In one embodiment, the method comprises indicating one of an increase and a decrease in each confidence level to the operator. Accordingly, increases and/or decreases in different confidence levels may be identified to the operator. This may be helpful to the operator when trying to acquire a particular element.

In one embodiment, the method comprises indicating to the operator a movement of the image capture apparatus required to increase a confidence level. Accordingly, an indication may be provided to the operator of how to move the image capture device in order to increase one or more of the confidence levels.

In one embodiment, the method comprises indicating to the operator when each confidence level exceeds a threshold amount. The threshold may be set such that when it is exceeded, it can be assumed that a suitable image of the element has been acquired and this may be identified to the operator.

In one embodiment, the method comprises storing at least one image frame when the confidence level for that image frame exceeds the threshold amount and associating that image frame with its specified element. Accordingly, image frames whose confidence level exceeds the threshold amount may be stored and associated with the specified element which is imaged within those image frames for future reference and/or selection.

In one embodiment, the method comprises storing at least one image frame when the confidence level for that image frame fails to exceed the threshold amount and associating that image frame with its specified element. Accordingly, one or more image frames which do not achieve the threshold amount may also be stored for future reference and/or selection since these may be useful when retraining the machine learning algorithm.

In one embodiment, the method comprises annotating stored image frames with an indication of its specified element. Accordingly, an indication of which element is imaged within that image frame may be annotated or provided with the stored image frame.

In one embodiment, the machine learning algorithm generates a feature map for each specified element, the feature map having map components and the method comprises generating a saliency map for that image frame which maps activated map components from the feature map to pixels in that image frame.

In one embodiment, the machine learning algorithm generates a feature map for each specified element, the feature map having map components and the method comprises, when the confidence level exceeds the threshold amount for that image frame, generating a saliency map for that image frame which maps activated map components from the feature map to pixels in that image frame. Accordingly, a feature map may be generated for each element. Each feature map may have map components or neurons which may be used to generate a saliency map for that image frame. The saliency map may map activated map components on the feature map spatially to pixels of the source image frame from which the feature map is derived in order to help identify the element in the image frame which has been recognised.

In one embodiment, the generating the saliency map comprises mapping a selected percentage of the most activated map components from the feature map to pixels in that image frame. Accordingly, those least activated map components or neurons on the feature map may be disregarded and only the more activated map components spatially mapped to pixels in the source image frame.

In one embodiment, the method comprises annotating image frames by highlighting its specified element using the saliency map. Accordingly, the saliency map may be used to highlight the element spatially within the image frames to help identify the element within those image frames.

In one embodiment, the highlighting comprises overlaying a bounding box surrounding that specified element.

In one embodiment, the highlighting comprises overlaying a colour change of pixels within the image frame defining that specified element.

In one embodiment, the highlighting comprises overlaying a measurement of the specified element.

In one embodiment, the method comprises indicating when each confidence level falls within different ranges of the confidence level. This provides a simple and intuitive way of indicating the confidence levels to the operator.

In one embodiment, the method comprises indicating a list of the specified elements to the operator. Accordingly, all the elements to be acquired may be indicated to the operator.

In one embodiment, the method comprises indicating in the list when at least one image frame has been stored and associated with its specified element. Indicating in the list which elements have been identified in image frames and those image frames stored, helps the operator to maintain a track of which elements have and have not yet been identified in an image frame.

In one embodiment, the method comprises indicating in the list when at least one image frame has yet to be stored and associated with its specified element.

In one embodiment, the method comprises, for each specified element, presenting each stored image frame associated with that specified element for selection by the operator. Accordingly, every image frame which has been stored and associated with an element is provided for selection by the operator.

In one embodiment, the step of presenting occurs once at least one image frame has been stored for every specified element.

In one embodiment, the method comprises discarding image frames associated with that specified element other than an image frame selected by the operator. Accordingly, those images which were not selected by the operator may be disregarded.

In one embodiment, the method comprises using the selected image frame for training of the machine learning algorithm. Accordingly, the selected image for each element may be used for subsequent training of the machine learning algorithm.

In one embodiment, the image data comprises a 3-dimensional image data set and the method comprises generating the image frames from the 3-dimensional image data set. Accordingly, image frames may be generated from the 3-dimensional image data set for processing.

In one embodiment, the generating comprises generating image frames representing a sequence of parallel planes through the 3-dimensional image data set.

In one embodiment, the generating comprises generating image frames representing a first sequence of parallel planes through the 3-dimensional image data set and image frames representing at least a second sequence of parallel planes through the 3-dimensional image data set orthogonal to the first sequence of parallel planes. Accordingly, the 3-dimensional image data set may be represented as a sequence of parallel planes in, for example, the x, y and z planes.

In one embodiment, the method comprises combining saliency maps from each sequence and performing a 3-dimensional transform to obtain an image frame having that specified element imaged on that specified plane through the 3-dimensional object. Accordingly, the saliency maps from each of the sequences of image frames may be combined and a 3-dimensional transform performed to obtain the parameters of a plane through the 3-dimensional image data which contains maximal saliency. The image frame on plane may then be processed by the machine learning algorithm and a confidence level allocated.

In one embodiment, the method comprises training the machine learning algorithm using batches of source training data, the source training data comprising image frames for each specified element imaged on the specified plane through the 3-dimensional object, one specified element being a background element where no item of interest is present. Accordingly, batches or groups of training data may be utilized. The training data may comprise one or more image frames for each element when imaged on the required plane and one of the elements may be a background element where no item or element of interest is present. Creating batches of training data in this way helps to ensure that each element is able to be identified and ensures that the machine-learning algorithm is able identify background images where no specified element is present.

In one embodiment, each batch of training data comprises image frames in similar numbers for each specified element including the background element. In order to adequately model the background element class, which is typically more complex and can have manifold appearances, the dataset is made up of a significantly larger number of background elements than foreground elements. To ensure that the machine learning algorithm learns to robustly distinguish between foreground and background elements it should be avoided to train on batches containing only background elements. Creating batches which contain image frames of each element in similar numbers prevents this pitfall In one embodiment, a format of image frames for the background element differ from a format of image frames for other specified elements and the method comprises adjusting a format of the image frames for other specified elements to align with that of the background element. Accordingly, the image frames may be altered to be each of a visually similar format.

In one embodiment, the method comprises including as the image frames for the background element, image frames from the source training data where greater than a threshold amount of movement occurs between adjacent image frames of the source training data. It will be appreciated that it is more likely that a background image may be identified from general image data when a high degree of movement occurs between image frames.

In one embodiment, the method comprises modifying image frames for each specified element between each batch of training data. Typically, the number of image frames for each specified element may be generally less than the number of frames for the background element. Modifying the image frames for each element enables those image frames to be re-used for training and helps prevent overfitting. Modifying the image frames helps to effectively increase the size of the dataset.

In one embodiment, the modifying comprises at least one of rotating, cropping, scaling, translating, mirroring, filtering, adding noise and adjusting brightness and contrast of image frames.

In one embodiment, the image data comprises one of ultrasound, magnetic resonance imaging, X-ray computed tomography, positron emission tomography and single-photon emission computed tomography image data taken through the 3-dimensional object. It will be appreciated that a variety of different image data types may be provided.

In one embodiment, the image data comprises one of recorded and real-time image data.

In one embodiment, the 3-dimensional object comprises one of a living and an inanimate object. It will be appreciated that a variety of different objects may be imaged.

In one embodiment, the 3-dimensional object comprises one of a foetus, an organ and an implant.

In one embodiment, the machine learning algorithm comprises a convolutional neural network.

According to a second aspect, there is provided an imaging apparatus, comprising: reception logic operable to receive image data of a 3-dimensional object; and logic operable to allocate a confidence level to at least a portion of an image frame of the image data using a machine-learning algorithm, the confidence level indicating a likelihood of that image frame having a specified element imaged on a specified plane through the 3-dimensional object.

In one embodiment, the logic is operable to allocate a plurality of confidence levels to the image frame of the image data, each confidence level indicating a likelihood of that image frame having a corresponding specified element imaged on a corresponding specified plane through the 3-dimensional object.

In one embodiment, the logic is operable to allocate a confidence level to each of a plurality of image frames of the image data.

In one embodiment, the image data is captured by an operator of an image capture apparatus and the logic is operable to indicate each confidence level to the operator.

In one embodiment, the logic is operable to indicate a change in each confidence level between image frames to the operator.

In one embodiment, the logic is operable to indicate one of an increase and a decrease in each confidence level to the operator.

In one embodiment, the logic is operable to indicate to the operator a movement of the image capture apparatus required to increase a confidence level.

In one embodiment, the logic is operable to indicate to the operator when each confidence level exceeds a threshold amount.

In one embodiment, the logic is operable to store at least one image frame when the confidence level for that image frame exceeds the threshold amount and associate that image frame with its specified element.

In one embodiment, the logic is operable to store at least one image frame when the confidence level for that image frame fails to exceed the threshold amount and associate that image frame with its specified element.

In one embodiment, the logic is operable to annotate stored image frames with an indication of its specified element.

In one embodiment, the machine learning algorithm is operable to generate a feature map for each specified element, the feature map having map components and the logic is operable, when the confidence level exceeds the threshold amount for that image frame, to generate a saliency map for that image frame which maps activated map components from the feature map to pixels in that image frame.

In one embodiment, the logic is operable to map a selected percentage of the most activated map components from the feature map to pixels in that image frame.

In one embodiment, the logic is operable to annotate image frames by highlighting its specified element using the saliency map.

In one embodiment, the logic is operable to highlight its specified element by overlaying a bounding box surrounding that specified element.

In one embodiment, the logic is operable to highlight its specified element by overlaying a colour change of pixels within the image frame defining that specified element.

In one embodiment, the logic is operable to highlight its specified element by overlaying a measurement of the specified element.

In one embodiment, the logic is operable to indicate when each confidence level falls within different ranges of the confidence level.

In one embodiment, the logic is operable to indicate a list of the specified elements to the operator.

In one embodiment, the logic is operable to indicate in the list when at least one image frame has been stored and associated with its specified element.

In one embodiment, the logic is operable to indicate in the list when at least one image frame has yet to be stored and associated with its specified element.

In one embodiment, the logic is operable, for each specified element, to present each stored image frame associated with that specified element for selection by the operator.

In one embodiment, the logic is operable to present each stored image frame once at least one image frame has been stored for every specified element.

In one embodiment, the logic is operable to discard image frames associated with that specified element other than an image frame selected by the operator.

In one embodiment, the logic is operable to use the selected image frame for training of the machine learning algorithm.

In one embodiment, the image data comprises a 3-dimensional image data set and the logic is operable to generate the image frames from the 3-dimensional image data set.

In one embodiment, the logic is operable to generate image frames representing a sequence of parallel planes through the 3-dimensional image data set.

In one embodiment, the logic is operable to generate image frames representing a first sequence of parallel planes through the 3-dimensional image data set and image frames representing at least a second sequence of parallel planes through the 3-dimensional image data set orthogonal to the first sequence of parallel planes.

In one embodiment, the logic is operable to combine saliency maps from each sequence and to perform a 3-dimensional transform to obtain an image frame having that specified element imaged on that specified plane through the 3-dimensional object.

In one embodiment, the logic is operable to train the machine learning algorithm using batches of source training data, the source training data comprising image frames for each specified element imaged on the specified plane through the 3-dimensional object, one specified element being a background element where no item of interest is present.

In one embodiment, each batch of training data comprises image frames in similar numbers for each specified element including the background element.

In one embodiment, a format of image frames for the background element differ from a format of image frames for other specified elements and the logic is operable to adjust a format of the image frames for other specified elements to align with that of the background element.

In one embodiment, the logic is operable to include as the image frames for the background element, image frames from the source training data where greater than a threshold amount of movement occurs between adjacent image frames of the source training data.

In one embodiment, the logic is operable to modify image frames for each specified element between each batch of training data.

In one embodiment, the logic is operable to modify image frames using at least one of rotating, cropping, scaling, translating, mirroring, filtering, adding noise and adjusting brightness and contrast of image frames.

In one embodiment, the image data comprises one of ultrasound, magnetic resonance imaging, X-ray computed tomography, positron emission tomography and single-photon emission computed tomography image data taken through the 3-dimensional object.

In one embodiment, the image data comprises one of recorded and real-time image data.

In one embodiment, the 3-dimensional object comprises one of a living and an inanimate object.

In one embodiment, the 3-dimensional object comprises one of a foetus, an organ and an implant.

In one embodiment, the machine learning algorithm comprises a convolutional neural network.

According to a third aspect, there is provided an imaging method, comprising: indicating to an operator a confidence level that an image frame of a 3-dimensional object has a specified element imaged on a specified plane through the 3-dimensional object.

In one embodiment, the indicating comprises indicating to the operator a plurality of confidence levels that an image frame of a 3-dimensional object has a corresponding one of a plurality of specified elements imaged on a corresponding specified plane through the 3-dimensional object.

In one embodiment, the method comprises indicating a change in each confidence level between image frames to the operator.

In one embodiment, the method comprises indicating one of an increase and a decrease in each confidence level to the operator.

In one embodiment, the method comprises indicating to the operator a movement of the image capture apparatus required to increase a confidence level.

In one embodiment, the method comprises indicating to the operator when each confidence level exceeds a threshold amount.

In one embodiment, the method comprises annotating image frames by highlighting its specified element using a saliency map.

In one embodiment, the highlighting comprises overlaying a bounding box surrounding that specified element.

In one embodiment, the highlighting comprises overlaying a colour change of pixels within the image frame defining that specified element.

In one embodiment, the highlighting comprises overlaying a measurement of the specified element.

In one embodiment, the method comprises indicating when each confidence level falls within different ranges of the confidence level.

In one embodiment, the method comprises indicating a list of the specified elements to the operator.

In one embodiment, the method comprises indicating in the list when at least one image frame has been stored and associated with its specified element.

In one embodiment, the method comprises indicating in the list when at least one image frame has yet to be stored and associated with its specified element.

In one embodiment, the method comprises, for each specified element, presenting each stored image frame associated with that specified element for selection by the operator.

In one embodiment, the step of presenting occurs once at least one image frame has been stored for every specified element.

In one embodiment, the image data comprises one of ultrasound, magnetic resonance imaging, X-ray computed tomography, positron emission tomography and single-photon emission computed tomography image data taken through the 3-dimensional object.

In one embodiment, the image data comprises one of recorded and real-time image data.

In one embodiment, the 3-dimensional object comprises one of a living and an inanimate object.

In one embodiment, the 3-dimensional object comprises one of a foetus, an organ and an implant.

According to a fourth aspect, there is provided an imaging apparatus, comprising: logic operable to indicate to an operator a confidence level that an image frame of a 3-dimensional object has a specified element imaged on a specified plane through the 3-dimensional object.

In one embodiment, the logic is operable to indicate to the operator a plurality of confidence levels that an image frame of a 3-dimensional object has a corresponding one of a plurality of specified elements imaged on a corresponding specified plane through the 3-dimensional object.

In one embodiment, the logic is operable to indicate a change in each confidence level between image frames to the operator.

In one embodiment, the logic is operable to indicate one of an increase and a decrease in each confidence level to the operator.

In one embodiment, the logic is operable to indicate to the operator a movement of the image capture apparatus required to increase a confidence level.

In one embodiment, the logic is operable to indicate to the operator when each confidence level exceeds a threshold amount.

In one embodiment, the logic is operable to annotate image frames by highlighting its specified element using a saliency map.

In one embodiment, the logic is operable to highlight by overlaying at least one of a bounding box surrounding that specified element, a colour change of pixels within the image frame defining that specified element and a measurement of the specified element.

In one embodiment, the logic is operable to indicate when each confidence level falls within different ranges of the confidence level.

In one embodiment, the logic is operable to indicate a list of the specified elements to the operator.

In one embodiment, the logic is operable to indicate in the list when at least one image frame has been stored and associated with its specified element.

In one embodiment, the logic is operable to indicate in the list when at least one image frame has yet to be stored and associated with its specified element.

In one embodiment, the logic is operable, for each specified element, to present each stored image frame associated with that specified element for selection by the operator.

In one embodiment, the logic is operable to present once at least one image frame has been stored for every specified element.

In one embodiment, the image data comprises one of ultrasound, magnetic resonance imaging, X-ray computed tomography, positron emission tomography and single-photon emission computed tomography image data taken through the 3-dimensional object.

In one embodiment, the image data comprises one of recorded and real-time image data.

In one embodiment, the 3-dimensional object comprises one of a living and an inanimate object.

In one embodiment, the 3-dimensional object comprises one of a foetus, an organ and an implant.

According to a fifth aspect, there is provided a computer program product operable, when executed on a computer, to perform the method of the first or third aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing embodiments in any more detail, first an overview will be provided. Embodiments provide a technique for locating elements, parts, components or features of a 3-dimensional object which have been imaged and which are represented in image data. Typically, those elements of the 3-dimensional object not only need to be recognised within the image data, but also those elements need to be identified or viewed in a particular orientation or in a particular imaging plane through the 3-dimensional object. For example, consider imaging a complex 3-dimensional part such as a mechanical assembly. It may be desirable not only to identify an element such as an O-ring within that mechanical assembly, but also to identify the O-ring when viewed in a plan view, rather than in a cross-sectional view. Equally, consider imaging a complex 3-dimensional part such as a human or animal body. It may be desirable not only to identify a valve of a heart, but also to identify the valve when viewed in a cross-sectional view, rather than a plan view.

Accordingly, embodiments utilise a machine learning algorithm which is trained to recognise such elements in an image frame when imaged on a specified plane through the 3-dimensional object. Typically, the machine learning algorithm is trained to identify more than one such element, each imaged on its own a particular plane, from the image data of the 3-dimensional object.

Once the initial training of the machine learning algorithm has been performed, real-time or stored image data may be supplied to the machine learning algorithm which then provides confidence levels indicating whether a particular image frame contains each element imaged on its associated plane. Typically, the machine learning algorithm generates a feature map for each element to be identified from which the confidence level for that element is derived. An indication of the confidence level for each element may be indicated to a human or robotic operator. Changes in confidence levels or an indication of an imaging direction change required to improve confidence levels may also be indicated to the operator.

When the confidence level for an element exceeds a threshold amount then the feature map for that element may be utilised to generate a saliency map. In particular, the most activated map components or neurons in the feature map are utilised since these are spatially-correlated with pixels in the image frame. The corresponding pixels in the image frame are typically augmented by changing their colour and/or placing a bounding box and/or setting all other pixels to a background value. Should a confidence level for an image frame exceed a threshold amount then that image frame may be stored and/or image frame augmentation performed to help identify the element within that image frame. As each element is recognised in the image data and an associated image stored, this may be indicated to the operator on a display. In particular, an indication of each element which has been identified or not identified may be indicated to the user. This enables individual elements to be quickly and reliably identified.

General Architecture

Figure 1:
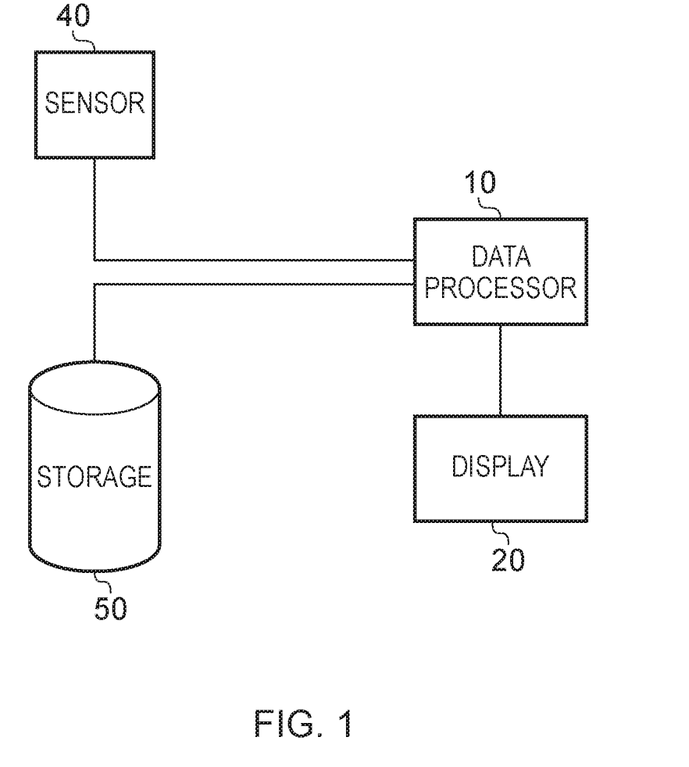
FIG. 1 illustrates an arrangement of the image processing apparatus according to one embodiment.

FIG. 1 illustrates an arrangement of the image processing apparatus according to one embodiment. A data processor 10 is provided which is coupled with a user display 20. Image data is provided to the data processor 10, either in real time from a sensor 40 or from storage 50. The image data may be provided from a variety of different sources in any of a number of different formats. The image data may comprise individual 2-dimensional image frames or may be 3-dimensional image data. Typically, the image data is provided by the sensor 40. It will be appreciated that any of a variety of different sensors may be used such as an ultrasound, magnetic resonance imaging, X-ray computed tomography, positron emission tomography (PET) or single-photon emission computed tomography (SPECT) device.

Machine Learning Algorithm Architecture

Figure 2:
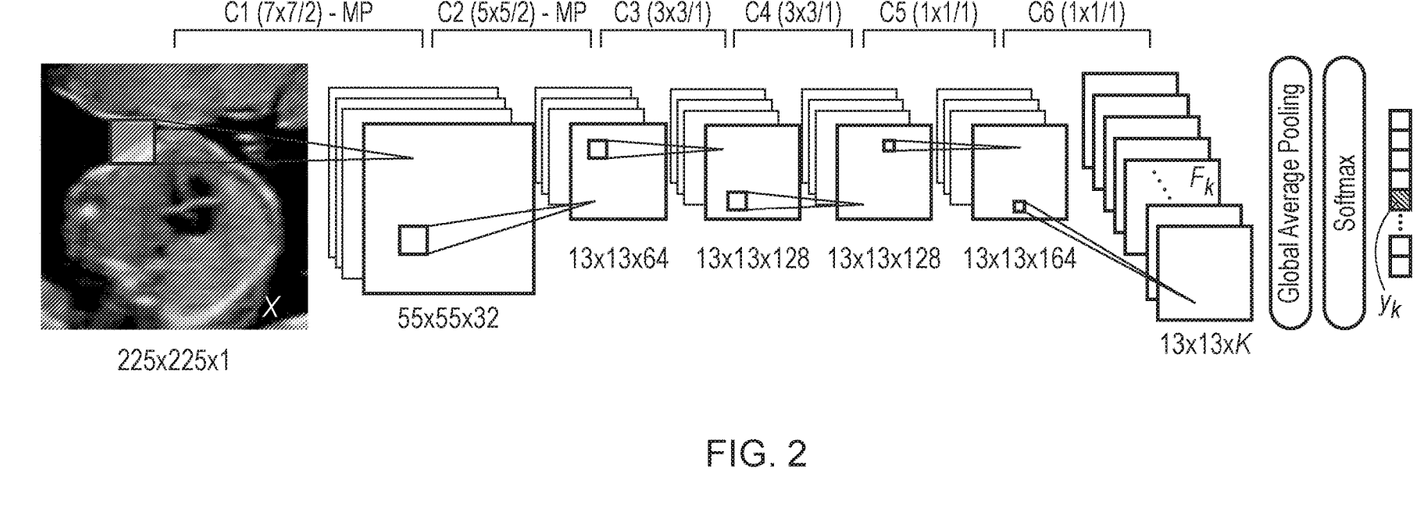
FIG. 2 summarises the architecture of the CNN according to one embodiment.

Embodiments utilise a convolutional neural network (CNN) or model executing on the data processor 10 to perform image recognition on the image data. The architecture of the CNN is summarised in FIG. 2 and described in Table 1. As can be seen in FIG. 2, the size and stride of the convolutional kernels are indicated at the top (notation: kernel size/stride). Max-pooling steps are indicated by MP (2×2 bins, stride of 2). The activation functions of all convolutions except C6 are rectified non-linear units (ReLUs). C6 is followed by a global average pooling step. The sizes at the bottom of each image/feature map refer to the training phase and will be slightly larger during inference due to larger input images.

TABLE 1

| Layer | Type | Input Size | Filter | Stride | Pad | Output Size |
| --- | --- | --- | --- | --- | --- | --- |
| C1 | Convolutional | 225x225x1 | 7x7x32 | 2 | 0 | 110x110x32 |
| M1 | Max Pool | 110x110x32 | 2x2 | 2 | 0 | 55x55x32 |
| C2 | Convolutional | 55x55x32 | 5x5x64 | 2 | 0 | 26x26x64 |
| M2 | Max Pool | 26x26x64 | 2x2 | 2 | 0 | 13x13x64 |
| C3 | Convolutional | 13x13x64 | 3x3x128 | 1 | 1 | 13x13x128 |
| C4 | Convolutional | 13x13x128 | 3x3x128 | 1 | 1 | 13x13x128 |
| C5 | Convolutional | 13x13x128 | 1x1x64 | 1 | 0 | 13x13x64 |
| C6 | Convolutional | 13x13x64 | 1x1xK | 1 | 0 | 13x13xK |
| AP | Average Pool | 13x13xK | — | — | — | 1xK |
| SM | Softmax | 1xK | — | — | — | 1xK |

Where K is the number of scan planes (K=13 in our case) and AP is a global average pooling layer, which averages all activations over the first two dimensions regardless of the size.

The CNN is a fully convolutional network architecture which replaces traditional fully connected layers with convolution layers using a 1×1 kernel [5, 9]. In the final convolutional layer (C6) the input is reduced to K 13×13 feature maps $F_k$, where K is the number of classes. Each of these feature maps is then averaged to obtain the input to the final Softmax layer. This architecture makes the network flexible with regard to the size of the input images. Larger images will simply result in larger feature maps, which will nevertheless be mapped to a scalar for the final network output. This fact is used to train on cropped square images rather than the full field of view which is beneficial for data augmentation.

A key aspect of the network architecture is that a one-to-one correspondence is enforced between each feature map $F_k$ and the respective prediction $y_k$. Since each neuron in the feature maps $F_k$ has a receptive field in the original image, during training, the neurons will learn to activate only if an object of class k is in that field. This allows to interpret $F_k$ as a spatially-encoded confidence map for class k [5]. This fact is used to generate localised saliency maps as described below.

Foetal Imaging

Although the image processing techniques of embodiments are applicable to medical and other imaging using a variety of imaging techniques, the following examples describe the image processing techniques with reference to the identification of standard scan planes in ultrasonic foetal imaging.

Abnormal foetal development is a leading cause of perinatal mortality in both industrialised and developing countries [11]. Although many countries have introduced foetal screening programmes based on mid-pregnancy ultrasound (US) scans at around 20 weeks of gestational age, detection rates remain relatively low. For example, it is estimated that in the UK approximately 26% of foetal anomalies are not detected during pregnancy [4]. Detection rates have also been reported to vary considerably across different institutions [1] which suggest that, at least in part, differences in training may be responsible for this variability. Moreover, according to the WHO, it is likely that worldwide many US scans are carried out by individuals with little or no formal training [11].

Biometric measurements and identification of abnormalities are performed on a number of standardised 2D US view planes acquired at different locations in the foetal body. In the UK, guidelines for selecting these planes are defined in [7]. Standard scan planes are often hard to localise even for experienced sonographers and have been shown to suffer from low reproducibility and large operator bias [4]. Thus, a system automating or aiding with this step could have significant clinical impact particularly in geographic regions where few highly skilled sonographers are available. It is also an essential step for further processing such as automated measurements or automated detection of anomalies.

Training

As mentioned above, although the image processing techniques of embodiments are illustrated with reference to the identification of standard scan planes in ultrasonic foetal imaging, it will be appreciated that these techniques are equally applicable to medical and other imaging using a variety of imaging techniques. In order to perform image processing of different 3-dimensional objects for different elements imaged on different planes, the machine learning algorithm would be trained using representative data of those different elements imaged on different planes.

In this example, a total dataset consists of 1003 2D US scans of consenting volunteers with gestational ages between 18-22 weeks which have been acquired by a team of expert sonographers using GE Voluson E8 systems. 80% of the total dataset is used for training (802 cases) and 20% (201 cases) of the total dataset is used for evaluation. For each scan a screen capture video of the entire procedure was recorded. Additionally, the sonographers saved "freeze frames" of a number of standard views for each subject. A large fraction of these frames have been annotated allowing the correct ground-truth (GT) label to be inferred. All video frames and images were down sampled to a size of 225×273 pixels to match the size of the images provided for subsequent recognition.

12 standard scan planes were considered based on the guidelines in [7]. In particular, the following were selected: two brain views at the level of the ventricles (Vt.) and the cerebellum (Cb.), the standard abdominal view, the transverse kidney view, the coronal lip, the median profile, and the femur and sagittal spine views. Four commonly acquired cardiac views were also included: the left and right ventricular outflow tracts (LVOT and RVOT), the three vessel view (3VV) and the 4 chamber view (4CH). In addition to the labelled freeze frames, 50 random frames were sampled from each video in order to model the background class, i.e., the "not a standard scan plane" class. Accordingly, data was provided to train the CNN to identify 13 different elements or categories; the 12 views of foetal organs mentioned above plus a background view which contains none of the 12 views.

The dataset was split into a test set containing 20% of the scans and a training set containing 80% of the scans. 10% of the training data was used as a validation set to monitor the training progress. In total, 12 standard view planes were modelled, plus one background class resulting in K=13 categories.

The CNN model was trained using mini-batch gradient descent and a categorical cross-entropy cost function. Should overfitting occur, then 50% dropout can be added after the C5 and C6 layers. To account for the significant class imbalance introduced by the background category, mini-batches were created with even class-sampling. Additionally, each batch was augmented by a factor of 5 by taking 225×225 square sub-images with a random horizontal and/or vertical translation and/or transforming them with a small random rotation and/or flips along the vertical and/or horizontal axis. Taking random square sub-images helps to introduce more variation to the augmented batches compared to training on the full field of view. This helps to reduce the overfitting of the network. The network was trained for 50 epochs and the network parameters were chosen which yielded the lowest error on the validation set.

As will be mentioned in more detail below, further training may be performed using operator selected image frames.

Image Recognition Operation

Figure 3:
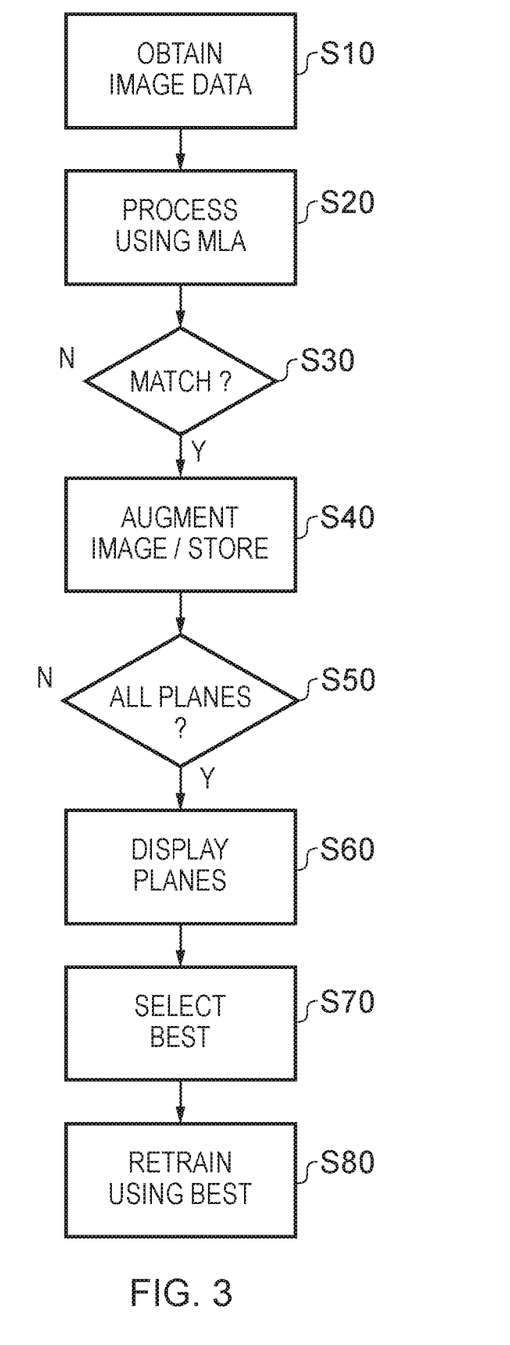
FIG. 3 is a flow chart showing the main processing steps performed by the data processor 10 according to one embodiment.

FIG. 3 is a flow chart showing the main processing steps performed by the data processor 10 according to one embodiment. Although this embodiment describes obtaining individual frames of image data, it will be appreciated that a 3-dimensional data set of an imaged 3-dimensional object may also be provided and sections or planes through that 3-dimensional data set provided as image frames.

Obtaining Images

At step S10, image data is obtained. In this embodiment, video frames containing the full field of view (i.e. 225×273 pixels of useful US data comprising the centre of the frame with the borders cropped to exclude hospital, patient and scanner data) of the input video are provided, one frame at a time. Such frames may be provided directly from the sensor 40 or retrieved from the storage 50.

Feature Maps

At step S20, an individual image frame 100 (see FIG. 4) is provided to the CNN for processing. This results in larger category-specific feature maps no of 13×16. The prediction $y_k$ and confidence $c_k$ of each frame are given by the prediction with the highest probability and the probability itself.

Figure 6:
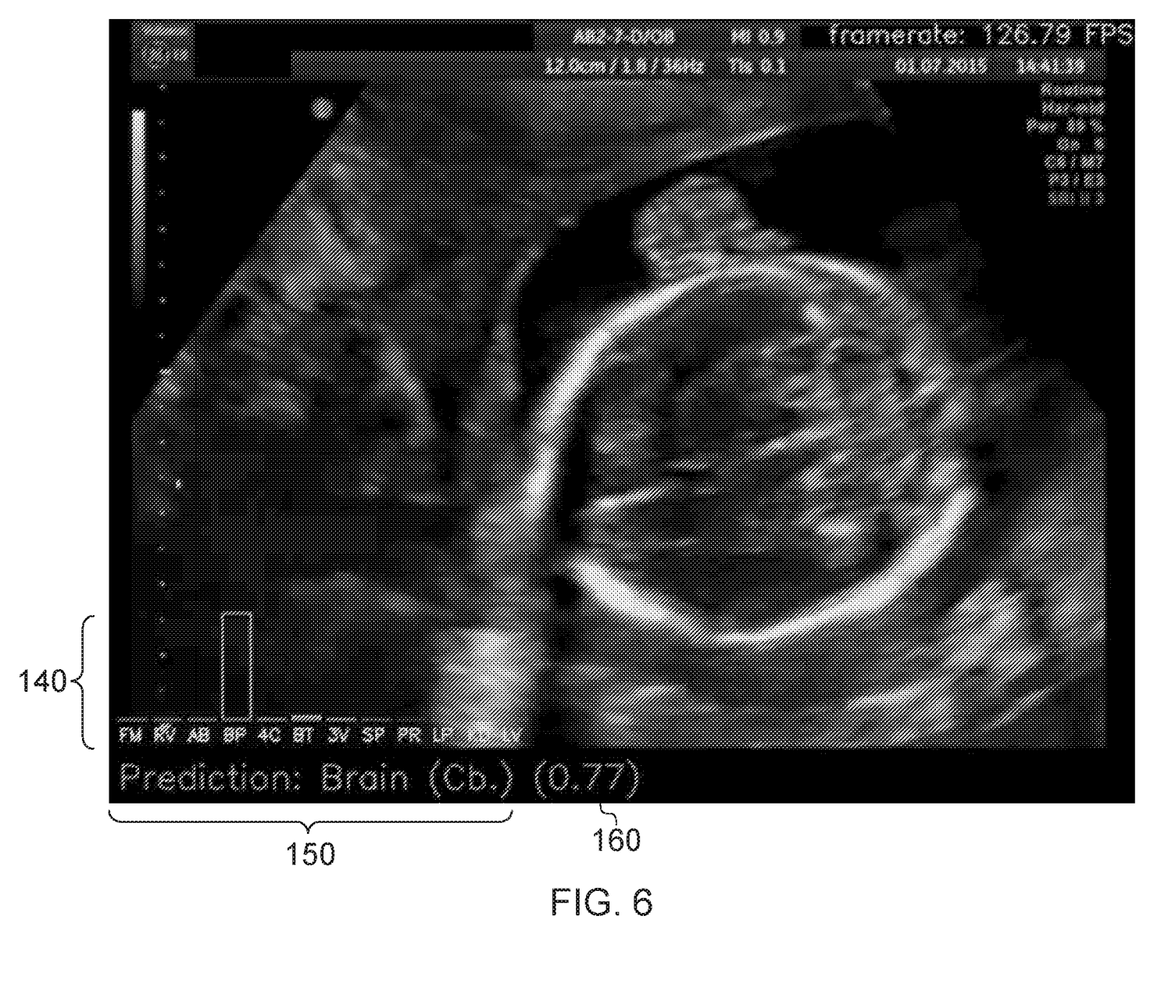
FIG. 6 shows an example display of confidence levels for each particular element according to one embodiment.

The confidence levels for each particular element may be displayed for the operator, as shown in FIG. 6, where each of the elements which are to be imaged are shown, together with a graphical representation of the confidence level for those elements. In this embodiment, these are indicated by a series of bars 140. Also, the element with the greatest confidence level is indicated using text 160, together with the confidence level 160.

Embodiments provide a traffic light system, where the confidence level for each element is assessed against two threshold levels. When the confidence level of an element is below a first threshold level, then a red indication is provided. When the confidence level of an element is above the first threshold level, but below a second threshold level, then a yellow indication is provided. When the confidence level of an element is above the second threshold level, then a green indication is provided.

Changes in confidence levels may be calculated and an indication provided to the operator of whether a confidence level is increasing or decreasing to assist in locating a particular element. The change in confidence level and image movement between frames can be used to derive a direction vector which may be indicated to the operator to assist in directing the sensor 40 to locate a particular element.

At step S30, it is determined whether a confidence level for that frame exceeds a threshold amount for a particular element, meaning that the image frame provides a suitable image of that element. If none of the confidence levels exceed the threshold amount (meaning that the image frame does not provide a suitable image of any elements), then processing proceeds to step S20 where the next frame is provided to the machine learning algorithm. If the confidence level exceeds the threshold at step S30 (meaning that the image frame provides a suitable image of at least one of the elements), then processing proceeds to step S40.

Saliency Maps

At step S40, image augmentation occurs to assist the operator in identifying the element recognised by the CNN. After obtaining the category k of the current frame X from a forward pass through the network, the feature map $F_k$ (i.e. the output of the C6 layer) corresponding to the predicted category k is examined.

Figure 4:
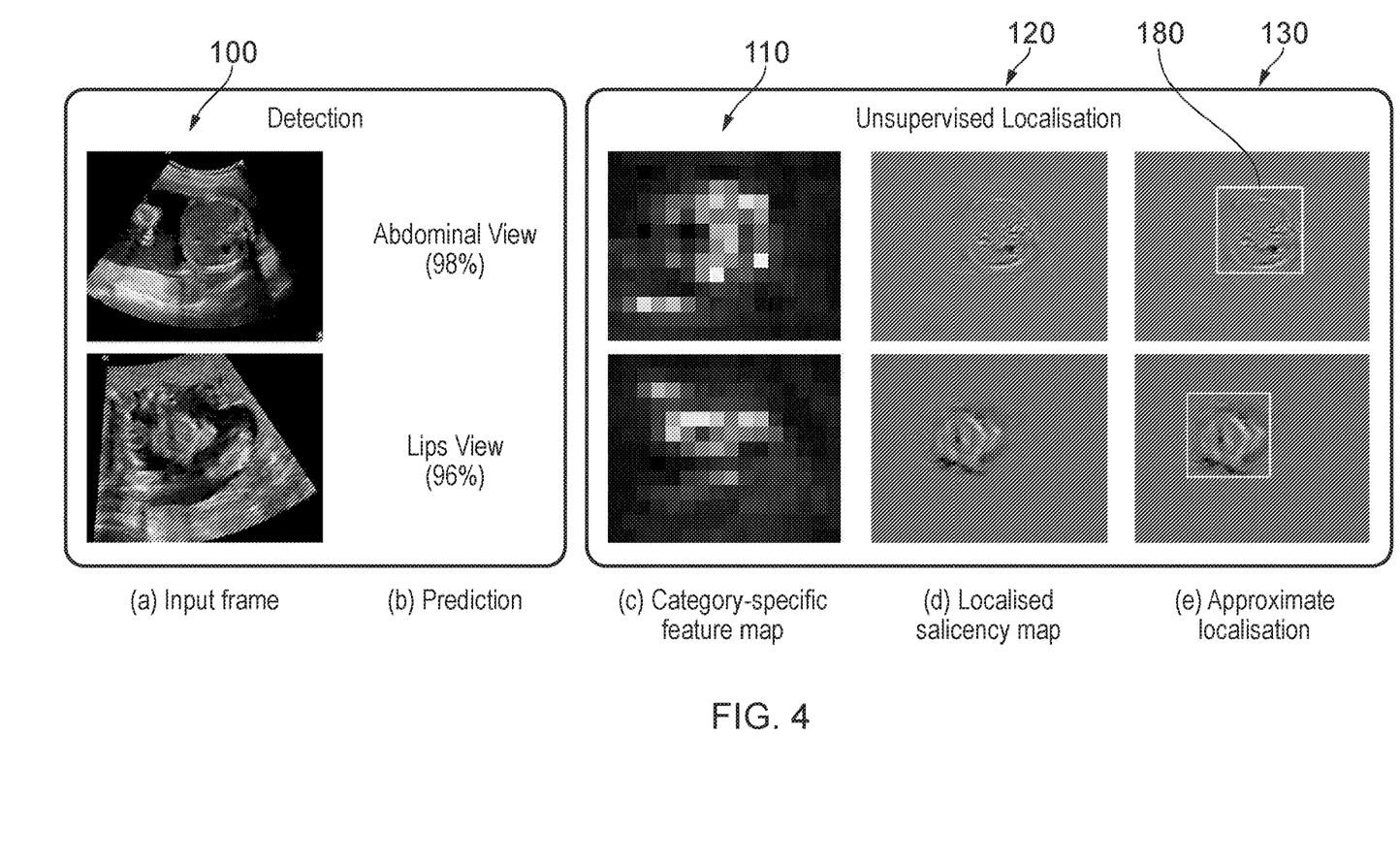
FIG. 4 provides an overview for two standard view examples according to embodiments.

FIG. 4 provides an overview for two standard view examples. Given a video frame (a), the trained convolutional neural network provides a prediction and confidence value (b). By design, each classifier output has a corresponding low-resolution feature map (c). Back-propagating the error from the most active feature neurons results in a saliency map (d). A bounding box can be derived using thresholding (e).

Hence, two examples of feature maps 110 are shown in FIG. 4c. It will be appreciated that the feature map $F_k$ could already be used to make an approximate estimate of the location of the respective anatomy similar to [9]. However, instead of using the feature maps directly, embodiments obtain localised saliency with the resolution of the original input images. For each neuron $F_k^{(p,q)}$ at the location p,q in the feature map it is possible calculate how much each original input pixel $X^{(i,j)}$ contributed to the activation of this neuron. This corresponds to calculating the partial derivatives $$S_k^{(i,j)} = \frac{\partial F_k^{(p,q)}}{\partial X^{(i,j)}}$$

which can be solved efficiently using an additional backwards pass through the network. [12] proposed a method for performing this back-propagation in a guided manner by allowing only error signals which contribute to an increase of the activations in the higher layers (i.e. layers closer to the network output) to back-propagate. In particular, the error is only back-propagated through each neuron's ReLU unit if the input to the neuron x, as well as the error in the higher layer $\delta_l$ are positive. That is, the back-propagated error $\delta_l$ of each neuron is given by $\delta_{l-1} = \delta_l \sigma(x) \sigma(\delta_l)$, where $\sigma(\cdot)$ is the unit step function.

Figure 5:
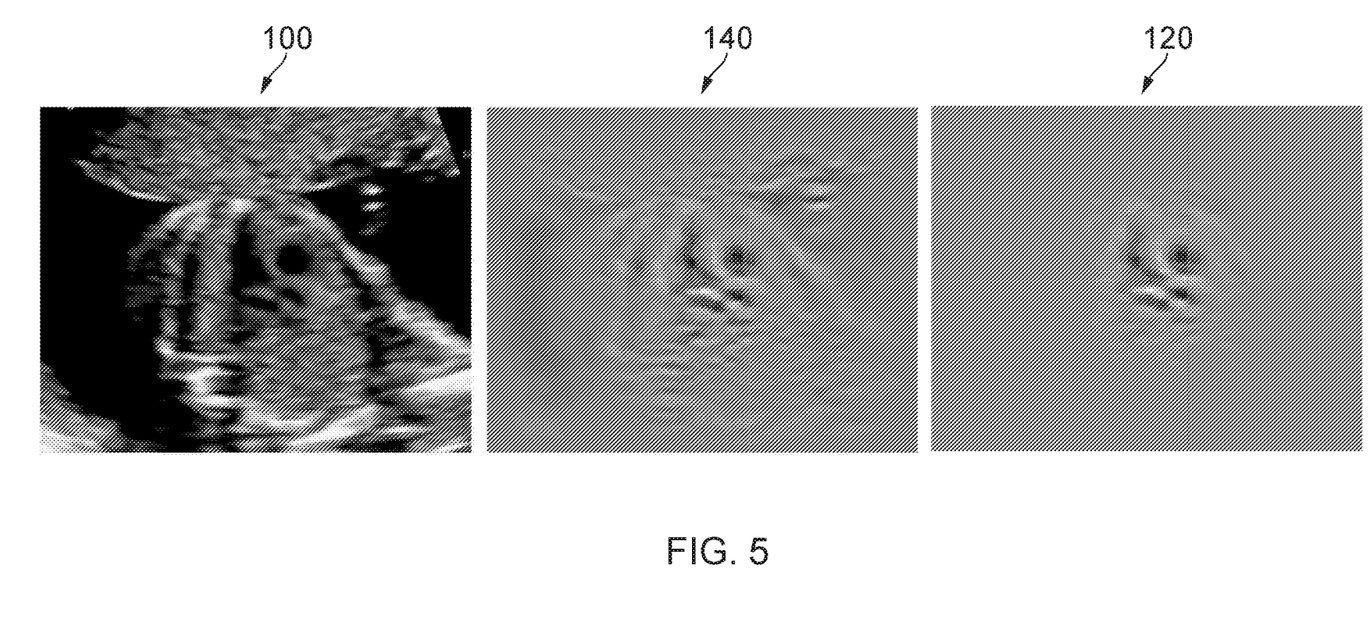
FIG. 5 shows a saliency map obtained from the input frame according to embodiments.

In contrast to [12] who back-propagated from the final output, embodiments take advantage of the spatial encoding in the category-specific feature maps and only back-propagate the errors for the 10% most active feature map neurons, i.e. the spatial locations where the foetal anatomy is predicted. The resulting saliency maps 120, 130 are significantly more localised compared to [12], as illustrated in FIG. 4d and FIG. 5. In particular, FIG. 5 shows a saliency map obtained from the input frame 100 (LVOT class), which is shown on the left. The middle map 140 was obtained using guided back-propagation from the average pool layer output [12]. The map 120 on the right was obtained by the embodiment mentioned above.

These saliency maps 120, 130 can be used as starting point for various image analysis tasks such as automated segmentation or measurements. In particular, they can be used for approximate localisation using image processing. The absolute value image of a saliency map |Sk| is blurred using a 25×25 Gaussian kernel and thresholding applied using Otsu's method [10]. The minimum bounding box 180 of the components in the thresholded image is then computed.

As shown in FIG. 4e, the saliency map 120, 130 may be used to augment the source image to highlight the identified element. For example, the bounding box 180 may be positioned around the identified element on the source image. Alternatively or additionally, the pixels with greater than a threshold value within the saliency map may be coloured on the source image. Alternatively or additionally, those pixels with less than a threshold value within the saliency map may set to constant value on the source image. Alternatively or additionally, the saliency map itself may be displayed. Alternatively or additionally, a measurement of the element shown in the saliency map may be displayed. Alternatively or additionally, a description 150 of the element and/or the confidence level 160 may be displayed.

Image Frame Storage

When the threshold is exceeded, the operator may be asked whether to store the image frame shown and/or the image frame shown may be stored automatically, typically in the storage 50 (with or without the image augmentation and/or saliency maps). Other image frames which also exceed the threshold may also be stored. In one embodiment, image frames which fail to exceed the threshold may also be stored—this may assist in subsequent learning as will be mentioned in more detail below.

For retrospective frame retrieval, for each subject the confidence for each class is calculated and recorded over the entire duration of an input video. Subsequently, the frame(s) with the highest confidence for each class are retrieved and stored.

As an image frame for each element is stored, this may be indicated to the operator (for example using the bars 140) so that it is clear which elements are still outstanding.

At step S50, a determination is made of whether every required image has been captured and, if not, processing returns to step S20 where the next image frame is analysed. If every image has been captured, then processing proceeds to step S60 where the captured images are displayed to an operator.

Image Selection

At step S70, the may operator select the best image frame captured for each element and typically the unselected images frames are discarded. As mentioned above, some of those image frames may include image frames which the CNN considers are not the best match. Should one of those image frames be selected, then this can help to retrain the CNN by including those in the training batches.

At step S80, the images selected by the operator are then added to a training set used for offline training of the machine learning algorithm.

Experimental Results

The ability of embodiments to detect standard frames by classifying the test data including the randomly sampled background class was evaluated. The achieved precision (pc) and recall (rc) scores are shown in Table 2. The lowest scores were obtained for cardiac views, which are also the most difficult to scan for expert sonographers. This fact is reflected in the low detection rates for serious cardiac anomalies (e.g. only 35% in the UK).

[2] have recently reported pc/rc scores of 0.75/0.75 for the abdominal standard view, and 0.77/0.61 for the 4CH view in US sweep data. Comparable values for the 4CH view were obtained and considerably better values for the abdominal view. However, with 12 modelled standard planes and free-hand US data this is significantly more complex. Using an Nvidia Tesla K80 graphics processing unit (GPU) embodiments were able to classify 113 frames per second (FPS) on average, and an Intel Core i7 clocked at 3.6 GHz achieved 40 FPS, although it will be appreciated that any modern GPU can be used to accelerate classification.

TABLE 2

Precision pc= TP/(TP + FP) and recall rc= TP/(TP + FN) for the classification of the modelled scan planes. Background class: pc= 0.96, rc= 0.93

| view | pc | rc | view | pc | rc | view | pc | rc |
|---|---|---|---|---|---|---|---|---|
| Brain (Vt.) | 0.96 | 0.90 | Lips | 0.85 | 0.88 | LVOT | 0.63 | 0.63 |
| Brain (Cb.) | 0.92 | 0.94 | Profile | 0.71 | 0.82 | RVOT | 0.40 | 0.46 |
| Abdominal | 0.85 | 0.80 | Femur | 0.79 | 0.93 | 3VV | 0.46 | 0.60 |
| Kidneys | 0.64 | 0.87 | Spine | 0.51 | 0.99 | 4CH | 0.61 | 0.74 |

With retrospective frame retrieval, the standard views were retrieved from videos of all test subjects and manually evaluated whether the retrieved frames corresponded to the annotated GT frames for each category. Several cases did not have GTs for all views because they were not manually included by the sonographer in the original scan. For those cases the retrieved frame was not evaluated. The results are summarised in Table 3.

TABLE 3

% of correctly retrieved frames for each standard view for all 201 test subjects

| view | % | view | % | view | % |
|---|---|---|---|---|---|
| Brain (Vt.) | 0.95 | Lips | 0.77 | LVOT | 0.73 |
| Brain (Cb.) | 0.89 | Profile | 0.76 | RVOT | 0.70 |
| Abdominal | 0.79 | Femur | 0.75 | 3VV | 0.66 |
| Kidneys | 0.87 | Spine | 0.77 | 4CH | 0.78 |

Figure 7:
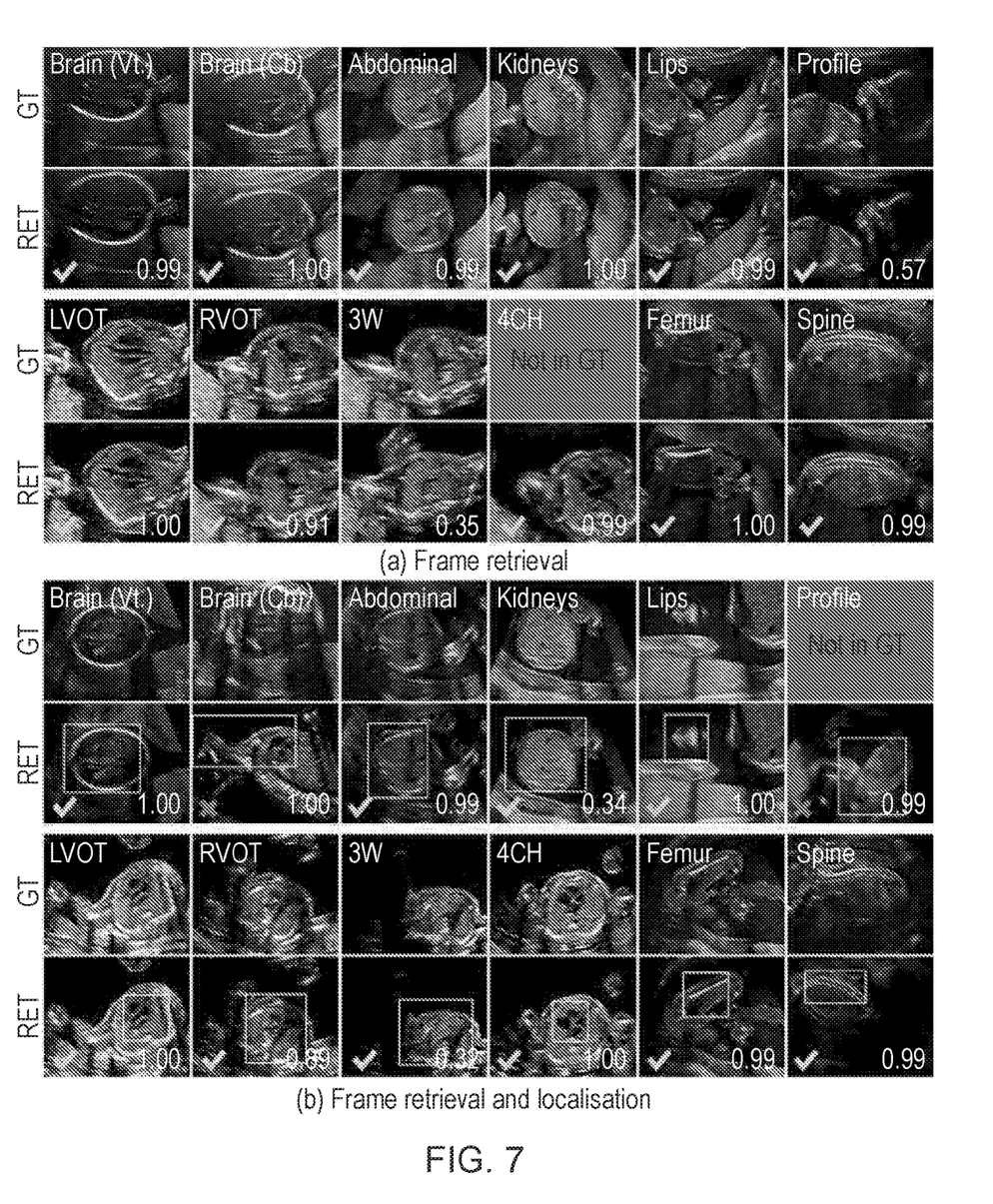
FIG. 7 shows examples of the retrieved frames for two volunteers according to one embodiment.

Examples of the retrieved frames for two volunteers are shown in FIG. 7 which shows retrieved standard frames (RET) and GT frames annotated and saved by expert sonographers for two volunteers. Correctly retrieved and incorrectly retrieved frames are denoted with a check mark or cross, respectively. Frames with no GT annotation are indicated. The confidence is shown in the lower right of each image. The frames in (b) additionally contain the results of localisation (boxes) according to embodiments.

In many cases, the retrieved planes match the expert GT almost exactly. Moreover, some planes which were not annotated by the experts were nevertheless found correctly. As before, most cardiac views achieved lower scores compared to other views.

The results for the approximate localisation of the respective foetal anatomy in the retrieved frames for one representative case are shown in FIG. 7b. Performing the localisation reduced the frame rate to 39 FPS on average.

It will be appreciated that in other embodiments a data set representing a 3-dimensional image of the object may be provided. In those embodiments, image frames from that data set may be provided. For example, a first set of image frames could be provided which represent parallel sections through the data set. Further sets of image frames could then be provided which represent parallel sections through the data set orthogonal to the other sets. Saliency maps from each sequence are combined and a 3-dimensional (for example, Hough) transform is performed to obtain the parameters of a plane through the 3-dimensional data containing that specified element.

Accordingly, embodiments provide a system for the automatic detection of twelve foetal standard scan planes from real clinical foetal US scans. The employed fully CNN architecture allowed for robust real-time inference. Furthermore, localised saliency maps are obtained by combining the information in category-specific feature maps with a guided back-propagation step. This enables modelling of a large number of foetal standard views from a substantial population of free-hand US scans. The method can be used to robustly annotate US data with classification scores exceeding values reported in related work for some standard planes, but in a much more challenging scenario. Embodiments can potentially be used to assist or train inexperienced sonographers. Embodiments can be used to retrieve standard scan planes retrospectively. In this manner, relevant key frames could be extracted from a video acquired by an inexperienced operator and sent for further analysis to an expert. The localised saliency maps can also be used to extract an approximate bounding box of the foetal anatomy.

Embodiments provide a real-time system which can automatically detect 12 commonly acquired standard scan planes in clinical free-hand 2D US data. The detection framework has been demonstrated for (1) real-time annotations of US data to assist sonographers, and (2) for the retrospective retrieval of standard scan planes from recordings of the full examination. Embodiments employ a fully convolutional neural network (CNN) architecture which allows robust scan plane detection at more than 100 frames per second. Furthermore, this architecture is extended to obtain saliency maps highlighting the part of the image that provides the highest contribution to a prediction (see FIG. 4). Such saliency maps provide a localisation of the respective foetal anatomy and can be used as starting point for further automatic processing. This localisation step is unsupervised and does not require ground-truth bounding box annotations during training.

Standard scan plane classification of 7 planes was proposed for a large foetal image database [13]. This differs significantly from embodiments since in that scenario it is already known that every image is in fact a standard plane whilst in video data the majority of frames do not show standard planes. A number of papers have proposed methods to detect foetal anatomy in videos of foetal 2D US sweeps (e.g. [6]). In those works the authors were aiming at detecting the presence of foetal structures such as the skull, heart or abdomen rather specific standardised scan planes. Automated foetal standard scan plane detection has been demonstrated for 1-3 standard planes in 2D foetal US sweeps [2, 3, 8]. [2, 3] also employed CNNs. US sweeps are acquired by moving the US probe from the cervix upwards in one continuous motion [3]. However, not all the standard views required to determine the foetus' health status are adequately visualised using a sweep protocol. For example, visualising the femur or the lips normally requires careful manual scan plane selection. Furthermore, data obtained using the sweep protocol are typically only 2-5 seconds long and consist of fewer than 50 frames [3]. It is believed that foetal standard scan plane detection has never been performed on true free-hand US data which typically consist of 10,000+ frames.

Moreover, none of related works were demonstrated to run in real-time, typically requiring multiple seconds per frame.

As mentioned above, foetal mid-pregnancy scans are typically carried out according to fixed protocols. Accurate detection of abnormalities and correct biometric measurements hinge on the correct acquisition of clearly defined standard scan planes. Locating these standard planes requires a high level of expertise. However, there is a worldwide shortage of expert sonographers. Accordingly, embodiments provide a fully automated system based on convolutional neural networks which can detect twelve standard scan planes as defined by the UK foetal abnormality screening programme. The network design allows real-time inference and can be naturally extended to provide an approximate localisation of the foetal anatomy in the image. Such a framework can be used to automate or assist with scan plane selection, or for the retrospective retrieval of scan planes from recorded videos. The method is evaluated on a large database of 1003 volunteer mid-pregnancy scans. It is shown that standard planes acquired in a clinical scenario are robustly detected with a precision and recall of 69% and 80%, which is superior to the current techniques. Furthermore, embodiments retrospectively retrieve correct scan planes with an accuracy of 71% for cardiac views and 81% for non-cardiac views.

Accordingly, it can be seen that embodiments provide a system that can: automatically detect the presence (or absence) of foetal standard scan planes; the predictions can be obtained at a rate exceeding that of the stream 2D US data i.e. in real-time; the predictions can be displayed to US operator on the screen for computer-assisted scanning; the predictions can be obtained for sequences acquired with arbitrary hand motion (i.e. no fixed acquisition protocol required); the standard scan planes can be extracted automatically in real-time or retrospectively from recorded 2D US stream datasets; each detected standard scan plane can be labelled (also in real-time) with a confidence of being that view; the confidence could be used to develop a "traffic light system" (green, orange, red) indicating when a specific view is satisfactory (green) and should be recorded to perform standard measurements; the generation of "saliency" images visualising the foetal anatomy belonging to a specific standard view; the saliency images can be obtained at a rate exceeding that of stream 2D US data; the screen view can be augmented by saliency images, visualising likely location of foetal anatomy in form of, for example, a heat-map; and/or extraction of bounding box approximately indicating location of foetal anatomy: (1) augmenting screen view, (2) Creating a cropped image containing the anatomy for subsequent image analysis, for example, contouring of bones. All of the above points have potential applications for automatically analysing videos acquired by non-experts, for example, in developing countries where a significant amount of scans are performed by untrained operators. The system can indicate to US operator in which direction to move the probe in order to reach a particular view. The system can provide automatic guidance of a robotic arm. For example, move probe towards areas of higher confidence of containing a particular view. Accordingly, embodiments perform: detection of standard views in a 3D volume (which ones are present?); extraction of one or more 2D standard views from a 3D volume (if present) and display to US operator; have the ability to do the above in real-time.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

REFERENCES

[1] Bull, C., et al.: Current and potential impact of foetal diagnosis on prevalence and spectrum of serious congenital heart disease at term in the UK. The Lancet 354(9186), 1242-1247 (1999)

[2] Chen, H., Dou, Q., Ni, D., Cheng, J. Z., Qin, J., Li, S. and Heng, P. A.: Automatic foetal ultrasound standard plane detection using knowledge transferred recurrent neural networks. In: Proc MICCAT, pp. 507-514. Springer (2015)

[3] Chen, H., Ni, D., Qin, J., Li, S., Yang, X., Wang, T., Heng, P.: Standard plane localization in foetal ultrasound via domain transferred deep neural networks. IEEE J Biomed Health Inform 19(5), 1627-1636 (2015)

[4] Kurinczuk, J., Hollowell, J., Boyd, P., Oakley, L., Brocklehurst, P., Gray, R.: The contribution of congenital anomalies to infant mortality. National Perinatal Epidemiology Unit, University of Oxford (2010)

[5] Lin, M., Chen, Q., Yan, S.: Network in network. arXiv: 1312.4400 (2013)

[6] Maraci, M., Napolitano, R., Papageorghiou, A., Noble, J.: Searching for structures of interest in an ultrasound video sequence. In: Proc MLMI, pp. 133-140 (2014)

[7] NHS Screening Programmes: Fetal anomalie screen programme handbook pp. 28-35 (2015)

[8] Ni, D., Yang, X., Chen, X., Chin, C. T., Chen, S., Heng, P. A., Li, S., Qin, J., Wang, T.: Standard plane localization in ultrasound by radial component model and selective search. Ultrasound Med Biol 40(11), 2728-2742 (2014)

[9] Oquab, M., Bottou, L., Laptev, I., Sivic, J.: Is object localization for free?—weakly—supervised learning with convolutional neural networks. In: IEEE Proc CVPR. pp. 685-694 (2015)

[10] Otsu, N.: A threshold selection method from gray-level histograms. Automatica 11(285-296), 23-27 (1975)

[11] Salomon, L., Alfirevic, Z., Berghella, V., Bilardo, C., Leung, K. Y., Malinger, G., Munoz, H., et al.: Practice guidelines for performance of the routine mid-trimester foetal ultrasound scan. Ultrasound Obst Gyn 37(1), 116-126 (2011)

[12] Springenberg, J., Dosovitskiy, A., Brox, T., Riedmiller, M.: Striving for simplicity: The all convolutional net. arXiv:1412.6806 (2014)

[13] Yaqub, M., Kelly, B., Papageorghiou, A., Noble, J.: Guided random forests for identification of key foetal anatomy and image categorization in ultrasound scans. In: Proc MICCAI, pp. 687-694. Springer (2015)

The invention claimed is:

1. An imaging method, comprising:
receiving image data of a 3-dimensional object; and
allocating a confidence level to at least a portion of an image frame of said image data using a machine-learning algorithm, said confidence level indicating a likelihood of that image frame having a specified element imaged on a specified plane through said 3-dimensional object;
wherein:
said allocating comprises allocating a plurality of confidence levels to said image frame of said image data, each confidence level indicating a likelihood of that image frame having a corresponding specified element imaged on a corresponding specified plane through said 3-dimensional object;
said allocating comprises allocating a confidence level to each of a plurality of image frames of said image data; and
said machine learning algorithm generates a feature map for each specified element, said feature map having map components;
when said confidence level exceeds a threshold amount for that image frame, generating a saliency map for that image frame which maps activated map components from said feature map to pixels in that image frame, wherein said generating said saliency map comprises mapping a selected percentage of the most activated map components from said feature map to pixels in that image frame; and
annotating image frames by highlighting its specified element using said saliency map, wherein said highlighting comprises overlaying at least one of a bounding box surrounding that specified element, a colour change of pixels within said image frame defining that specified element and a measurement of said specified element.

2. An imaging method comprising:
receiving image data of a 3-dimensional object; and
allocating a confidence level to at least a portion of an image frame of said image data using a machine-learning algorithm, said confidence level indicating a likelihood of that image frame having a specified element imaged on a specified plane through said 3-dimensional object;
wherein:
said image data comprises a 3-dimensional image data set and said method comprises generating said image frames from said 3-dimensional image data set;
said generating comprises generating image frames representing a sequence of parallel planes through said 3-dimensional image data set; and
said generating comprises generating image frames representing a first sequence of parallel planes through said 3-dimensional image data set and image frames representing at least a second sequence of parallel planes through said 3-dimensional image data set orthogonal to said first sequence of parallel planes;
further comprising combining saliency maps from each sequence and performing a 3-dimensional transform to obtain an image frame having that specified element imaged on that specified plane through said 3-dimensional object.

3. An imaging apparatus, comprising:
reception logic operable to receive image data of a 3-dimensional object; and
logic operable to allocate a confidence level to at least a portion of an image frame of said image data using a machine-learning algorithm, said confidence level indicating a likelihood of that image frame having a specified element imaged on a specified plane through said 3-dimensional object;
wherein said machine learning algorithm generates a feature map for each specified element, said feature map having map components and said logic is operable, when said confidence level exceeds said threshold amount for that image frame, to generate a saliency map for that image frame which maps activated map components from said feature map to pixels in that image frame.

4. The imaging apparatus of claim 3, wherein said logic is operable to allocate a plurality of confidence levels to said image frame of said image data, each confidence level indicating a likelihood of that image frame having a corresponding specified element imaged on a corresponding specified plane through said 3-dimensional object.

5. The imaging apparatus of claim 4, wherein said logic is operable to allocate a confidence level to each of a plurality of image frames of said image data.

6. The imaging apparatus of claim 3, wherein said logic is operable to indicate one of an increase and a decrease in each confidence level to said operator.

7. The imaging apparatus of claim 3, wherein said logic is operable to indicate to said operator a movement of said image capture apparatus required to increase a confidence level.

8. The imaging apparatus of claim 3, wherein said logic is operable to indicate to said operator when each confidence level exceeds a threshold amount.

9. The imaging apparatus of claim 8, wherein said logic is operable to store at least one image frame when said confidence level for that image frame exceeds said threshold amount and associate that image frame with its specified element.

10. The imaging apparatus of claim 3, wherein said logic is operable to map a selected percentage of the most activated map components from said feature map to pixels in that image frame.

11. The imaging apparatus of claim 3, wherein said logic is operable to annotate image frames by highlighting its specified element using said saliency map.

12. The imaging apparatus of claim 11, wherein said logic is operable to highlight its specified element by overlaying at least one of a bounding box surrounding that specified element, a colour change of pixels within said image frame defining that specified element and a measurement of said specified element.

13. The imaging apparatus of claim 3, wherein said logic is operable to train said machine learning algorithm using batches of source training data, said source training data comprising image frames for each specified element imaged on said specified plane through said 3-dimensional object, one specified element being a background element where no item of interest is present.

14. The imaging apparatus of claim 13, wherein a format of image frames for said background element differ from a format of image frames for other specified elements and said logic is operable to adjust a format of said image frames for other specified elements to align with that of said background element.

15. The imaging apparatus of claim 13, wherein said logic is operable to include as said image frames for said background element, image frames from said source training data where greater than a threshold amount of movement occurs between adjacent image frames of said source training data.

16. An imaging apparatus comprising:
reception logic operable to receive image data of a 3-dimensional object; and
logic operable to allocate a confidence level to at least a portion of an image frame of said image data using a machine-learning algorithm, said confidence level indicating a likelihood of that image frame having a specified element imaged on a specified plane through said 3-dimensional object;
wherein:
said image data comprises a 3-dimensional image data set and said logic is operable to generate said image frames from said 3-dimensional image data set;
said logic is operable to generate image frames representing a sequence of parallel planes through said 3-dimensional image data set;
said logic is operable to generate image frames representing a first sequence of parallel planes through said 3-dimensional image data set and image frames representing at least a second sequence of parallel planes through said 3-dimensional image data set orthogonal to said first sequence of parallel planes; and
said logic is operable to combine saliency maps from each sequence and to perform a 3-dimensional transform to obtain an image frame having that specified element imaged on that specified plane through said 3-dimensional object.

\* \* \* \* \*